(12) United States Patent
Meadows et al.

(10) Patent No.: US 9,443,179 B2
(45) Date of Patent: Sep. 13, 2016

(54) CONSUMER PRODUCTS PACKAGING AND METHODS FOR PRODUCING PACKAGING

(75) Inventors: Grant Robert Meadows, Middlesex (GB); Jonathan Richard Stonehouse, Surrey (GB)

(73) Assignee: The Procter & Gamble Company, Cincinnati, OH (US)

( * ) Notice: Subject to any disclaimer, the term of this patent is extended or adjusted under 35 U.S.C. 154(b) by 1122 days.

(21) Appl. No.: 13/526,852

(22) Filed: Jun. 19, 2012

(65) Prior Publication Data

US 2013/0334086 A1  Dec. 19, 2013

(51) Int. Cl.
*H01L 51/56* (2006.01)
*G06K 19/06* (2006.01)

(52) U.S. Cl.
CPC ... *G06K 19/06037* (2013.01); *G06K 19/06056* (2013.01); *G06K 19/06093* (2013.01)

(58) Field of Classification Search
USPC .......... 206/459.1, 459.5, 524.1; 347/84, 110
See application file for complete search history.

(56) References Cited

U.S. PATENT DOCUMENTS

| | | | |
|---|---|---|---|
| 5,327,260 A | 7/1994 | Shimomae et al. | |
| 5,640,191 A | 6/1997 | Zulian et al. | |
| 6,104,812 A | 8/2000 | Koltai et al. | |
| 6,520,330 B1 * | 2/2003 | Batra | A47K 10/42 206/459.5 |
| 9,314,953 B2 * | 4/2016 | Lauer | B29C 47/0069 |
| 2005/0053405 A1 | 3/2005 | Brouhon et al. | |
| 2011/0194152 A1 | 8/2011 | Simske et al. | |
| 2011/0290694 A1 * | 12/2011 | Fuisz | A61J 3/00 206/459.5 |
| 2014/0138277 A1 * | 5/2014 | Raming | G09F 3/0288 206/459.5 |
| 2015/0203236 A1 * | 7/2015 | Etesse | B29C 49/04 215/43 |
| 2015/0274413 A1 * | 10/2015 | Brandt Sanz | B65B 3/022 206/459.5 |

OTHER PUBLICATIONS

International Search Report dated Jul. 31, 2013, 12 pages.

* cited by examiner

*Primary Examiner* — Jacob K Ackun

(74) *Attorney, Agent, or Firm* — David K Mattheis; Jason J Camp; James C Vago

(57) ABSTRACT

A product package comprises an indicia printed thereon. The indicia comprises a set of visibly discernible individual dots. The dots are arrayed to form the indicia and at least a portion of the dots are offset from their nearest neighbor dots by less than one dot diameter in one direction or at an offset angle of other than 45 or 90 degrees.

17 Claims, 3 Drawing Sheets

CONSUMER PRODUCTS PACKAGING AND METHODS FOR PRODUCING PACKAGING

FIELD OF THE INVENTION

The invention relates to packaging for products. The invention relates specifically to means for differentiating and identifying authentic packages and the authentic packages produced thereby.

BACKGROUND OF THE INVENTION

Products are provided in a broad range of packaging. Both primary packaging—the package containing the product itself, and subsequent packages which contain the primary package are utilized to ensure that the consumer receives the product in the intended usable form.

Packaging may be labeled and/or marked with a variety of indicia to communi to the shopper and the consumer the contents of the package. The source of the product, information regarding the composition of both the product and package may also be provided via package indicia.

In some instances products are coded with information by the product manufacturer to distinguish product lots on the basis of manufacturing site and/or production date and time. Such indicia allow product to be identified throughout the consumer supply chain including after purchase if such identification is necessary.

On-package indicia may be created as the package is produced such as in-mold embossments or debossments. Mold numbers and plastic types are often marked upon plastic packages in this manner. Indicia may be printed upon packages at manufacturing as well. Flexographic and rotogravure printing may be utilized to print package artwork and information upon the package. Ink-jet coders and laser coders may be utilized to mark the package both at package manufacturing and at the time the package is filled with product. These coders may be utilized late in the overall product manufacturing process to mark production location, date and time of product filling.

Current ink-jet coding equipment is limited in its output by the matrixed nature of the dots the equipment is capable of producing. Typical coder printers may yield characters created from a combination of dots with each possible dot corresponding to a predefined location within a matrix of dots. The relative position of the dots in the matrix can be described by the minimum offset of each dot from its nearest neighbors. The center of each dot is typically offset from its neighbors by at least one dot diameter in each of an x and y directions, as illustrated in FIG. 1. This fixed relationship of the dots and the minimum offset of at least one diameter in two directions reduces the ability of the coder to print curves upon the target surface. The relationship between any dot and its neighbor printed in the adjacent row and column is limited to (at best) being 90 degrees offset (up, down, left and right) or 45 degrees offset. Other angular displacements are not available in the adjacent neighbor dots. The offset between respective dots may be characterized using an x,y coordinate system and providing the offset in each of two directions from an arbitrarily selected origin dot. Known code printers yield dot sets having offsets characterized in terms of multiples of whole dot diameters. As an example, the x offset may be characterized as 1, 2, 3 . . . diameters and the y offset similarly characterized as 1,2,3 . . . dot diameters.

What is desired is a more flexible method for printing a curved set of dots, or a set of dots having differing diameters, upon a package to enable the late stage use of curves in product identification. The invention relates to methods for printing packages at a late product manufacturing stage with curved indicia i.e indicia wherein a set of printed ink dots have at least one nearest neighbor offset at other than 45 or 90 degrees and at a dimensional offset characterised as a non-integer number of dot diameters in at least one direction.

SUMMARY OF THE INVENTION

In one aspect, a product package comprises an indicia printed thereon. The indicia comprises a set of visibly discernible individual dots. The dots are arrayed to form the indicia and at least a portion of the dots are offset from their nearest neighbor dots by less than one dot diameter in one direction or at an offset angle of other than 45 or 90 degrees. At least a portion of the dots have an offset characterized by a non-integer number of dot diameters in at least one direction.

In one aspect, a product package comprises an indicia printed thereon. The indicia comprises a set of visibly discernible individual dots. The dots are arrayed to form the indicia and at least a portion of the dots are offset from their nearest neighbor dots by a non-integer number of dot diameters in one direction or at an offset angle of other than 45 or 90 degrees. In this aspect, the set of dots also comprises dots of a first diameter interspersed with at least one dot of a second diameter wherein the first diameter differs from the second diameter. A plurality of dots of the second diameter may be arrayed in a pattern secondary to and overlaid upon the overall pattern of the set of dots of the indicia.

In one aspect, a product package comprises an indicia indicating the product batch. The batch indicia or code comprises characters indicating the date and or time the product was packaged and a curved indicia to indi that the product is authentic. The authenticity indicia comprises a set of visibly discernible individual dots. The dots are arrayed to form the indicia and at least a portion of the dots are offset from their nearest neighbor dots by a non-integer number of dot diameter in one direction or at an offset angle of other than 45 or 90 degrees. The set of dots may also comprise dots of a first diameter interspersed with dots of a second diameter wherein the first diameter differs from the second diameter. The dots of the second diameter may be arrayed in a secondary pattern overlaid upon the pattern of the overall authenticity indicia.

In one aspect, a product package comprises an indicia indicating the product batch. The batch indicia or code comprises characters indicating the date and or time the product was packaged and a curved indicia to indi that the product is authentic. The authenticity indicia comprises a set of visibly discernible individual dots. The dots are arrayed to form the indicia. The set of dots comprises dots of a first diameter interspersed with dots of a second diameter wherein the first diameter differs from the second diameter. The dots of the second diameter may be arrayed in a secondary pattern overlaid upon the pattern of the overall authenticity indicia.

In one aspect, a method for printing a package comprises steps of providing a package, printing an array of individual dots, wherein at least a portion of the dots are printed out-of-matrix.

BRIEF DESCRIPTION OF THE DRAWINGS

Figure 3:
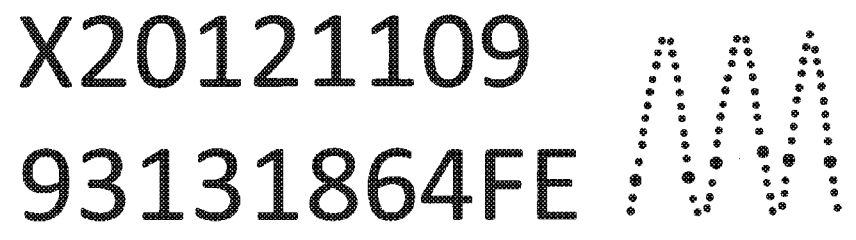

FIG. 3 illustrates a batch code according to one embodiment of the invention.

DETAILED DESCRIPTION OF THE INVENTION

Figure 1:
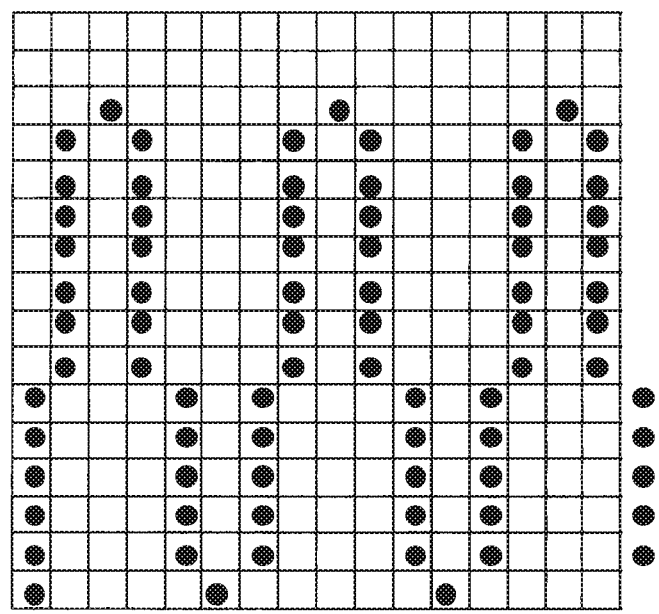
FIG. 1 illustrates the limited positions of dots available in typical ink-jet printed indicia.
Figure 2:
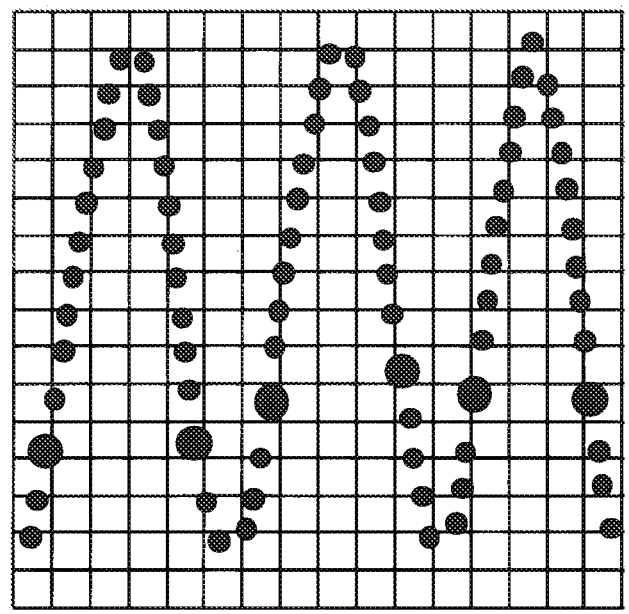
FIG. 2 illustrates an indicia according to one embodiment of the invention.

As used herein, package means: the primary, secondary tertiary or other material object containing a product. Exemplary packages include, without limitation, bottles, cans, cartons, boxes, bags, pouches comprised of glass, metal, paper and polymers. The package may contain the product itself or may contain the package which in turn contains the product or in some case contain the secondary package which in turn contains the primary package. As an example, a stretch-wrap polymer film may surround and unitize a collection of cartons upon a pallet. Each of the cartons may contain a set of paperboard and thermoformed polymer clamshell containers each container containing a razor handle and an injection molded container containing a set of blade cartridges for the razor handle. Each of these elements beyond the actual razor handle and cartridges is considered a package according to the invention.

As used herein, batch code means: a printed code of characters upon a package comprising characters analogous with, or indicative of, the location and/or temporal data associated with the production of the packaged product or the package itself.

As used herein, visibly discernible means: that the object or property may be observed visually without the need of any magnification.

As used herein, dimensional offset means: for any two printed dots, the center to center distance in each or either of an x and y direction according to a coordinate system established by the relationship of other dots within the same printed pattern.

As used herein, angular offset means: for any two printed dots, the angle of displacement of one dot center from the other as determined against a reference coordinate system defined by the relationship of other dots within the same printed pattern.

As used herein, out-of-matrix means: printed dots in a pattern, the dots having a nearest neighbor angular offset of other than 90 or forty-five degrees or a nearest neighbor dimensional offset of a non-integer number of dot diameters as determined against a matrix of dot positions established by other dots in the same printed pattern.

In one embodiment, a package comprises an indicia. The indicia comprises a pattern of individual dots. Each of the pattern of dots having a first dot diameter. The pattern set substantially against an orthogonal x-y coordinate system, at least a portion of the dots having nearest neighbors dimensionally offset by a non-integer number of first dot diameters in at least one of the x and y directions. The offset of the patterned dots may be determined by selecting any of the dots to serve as the origin of the pattern and then determining the noffset of each other dot of the pattern with regard to the origin dot. Dots of the pattern may have x and y offset distances equal to an integer number of dot diameters in addition to some portion of the pattern of dots having at least one of the x or y dimensional offset distances equal to a non-integer number of dot diameters.

In one embodiment, the indicia further comprising dots having a second dot diameter, the second dot diameter substantially different from the first dot diameter. In this embodiment, the offset of the dots may comprise integer and/or non-integer dot diameter dimensions. The dots having the second diameter comprises printed dots wherein more than a single ink droplet is combined as the dots are printed to increase the actual ink volume disposed at the particular location where the second diameter dot is desired.

In one embodiment, the dots having a second dot diameter are arranged in a pattern distinct from the pattern of the indicia. In this embodiment, there are at least two dot patterns. The first overall pattern consists of all of the printed dots and the second pattern consisting only of the dots having the second diameter.

In one embodiment, the indicia comprises one or more characters. The characters may be alpha-numeric or may be symbols. In one embodiment, the distinct pattern of the second dot diameter dots is associated with at least one character of the indicia.

In one embodiment, the indicia comprises a plurality of characters, the plurality of characters associated with a processing date of the package or information relating to the product. In this embodiment the indicia may be considered a batch or production code. The set of characters may contain encoded information relating to any of the date, time and location of production of the coded article, or combinations of these pieces of information.

The printed article may comprise an actual priodut or it may comprise primary secondary tertiary or subsequent levels of product packaging.

In one embodiment, the manufacturer of the code printing equipment may incorporate a mode of operation enabling the user of the printer to assign any level of charge to each drop emitted in the jet of drops. This mode enables the disposition of the drops to be configured such that adjacent drops are disposed at x, y, offset dimensions which are non-integer multiples of the drop or dot diameter.

In one embodiment, the charge levels of chosen drops are manipulated to cause the coalescence of two drops in flight and control the trajectory of the double volume drop to make it reach the substrate, for example, at the same impact position as in the original symbol. Coalescence occurs when two drops in-flight converge with sufficient kinetic energy to overcome the forces of electrostatic repulsion. As soon as physical contact occurs, the 2 drops combine due to surface tension to minimize the overall surface of the new drop whose volume has doubled and the charge of the combined drop is the cumulative value of the 2 uncombined drops. The size of the impact will be significantly larger, perfectly detectable with the naked eye and of a very specific nature compared to the dual impact of 2 isolated drops.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A package comprising an indicia, the indicia comprising a pattern of individual dots, each dot having a first dot diameter, the dots arrayed in a pattern, the pattern set substantially against an orthogonal x-y coordinate system, at least a portion of the dots having nearest neighbors dimensionally offset by a non-integer number of first dot diameters in at least one of the x and y directions.

2. The package of claim 1, the indicia further comprising at least one dot having a second dot diameter, the second dot diameter substantially different from the first dot diameter.

3. The package according to claim 2, the dots having a second dot diameter being arranged in a pattern distinct from the pattern of the indicia.

4. The package according to claim 3, the indicia comprising one or more characters, wherein the distinct pattern of the second dot diameter dots is associated with at least one character of the indicia.

5. The package according to claim 1, the indicia comprising a plurality of characters, the plurality of characters associated with a processing date of the package.

6. The package according to claim 1, at least a portion of the indicia comprising out-of-matrix dots.

7. The package according to claim 1, wherein the package comprises a primary product package.

8. The package according to claim 1, wherein the package comprises a secondary package.

9. The package according to claim 1 wherein the indicia comprises a batch code.

10. A package comprising a printed indicia, the printed indicia comprising at least one alpha-numeric character and a set of out-of-matrix dots having a first dot diameter and disposed in a pattern, the pattern of the out-of-matrix dots associated with the at least one character.

11. The package according to claim 10, the indicia comprising a plurality of characters, the plurality of characters associated with a processing date of the package.

12. The package of claim 10, the indicia further comprising dots having a second dot diameter, the second dot diameter substantially different from, and larger than, the first dot diameter.

13. The package according to claim 12, the dots having a second dot diameter being arranged in a pattern distinct from the pattern of the indicia.

14. The package according to claim 13, wherein the distinct pattern of the second dot diameter dots is associated with at least one character of the indicia.

15. The package according to claim 10, wherein the package comprises a primary product package.

16. The package according to claim 10, wherein the package comprises a secondary package.

17. The package according to claim 10, the indicia comprising a batch code.

* * * * *